US007585817B2

(12) United States Patent
Pope et al.

(10) Patent No.: US 7,585,817 B2
(45) Date of Patent: Sep. 8, 2009

(54) COMPOSITIONS AND METHODS FOR IMPROVING THE PRODUCTIVITY OF HYDROCARBON PRODUCING WELLS USING A NON-IONIC FLUORINATED POLYMERIC SURFACTANT

(75) Inventors: Gary A. Pope, Austin, TX (US); Jimmie R. Baran, Jr., Prescott, WI (US)

(73) Assignees: Board of Regents, The University of Texas System, Austin, TX (US); 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/843,526

(22) Filed: Aug. 22, 2007

(65) Prior Publication Data

US 2008/0051551 A1 Feb. 28, 2008

Related U.S. Application Data

(63) Continuation-in-part of application No. 11/508,498, filed on Aug. 23, 2006, now abandoned.

(51) Int. Cl.
*C09K 8/60* (2006.01)
*E21B 43/16* (2006.01)

(52) U.S. Cl. .................. 507/205; 507/224; 507/910; 507/922; 166/305.1; 166/308.1; 166/308.4

(58) Field of Classification Search ................ 507/205, 507/204, 910, 922; 166/305.1, 308.1, 308.4
See application file for complete search history.

(56) References Cited

U.S. PATENT DOCUMENTS

| 2,732,398 | A | 1/1956 | Brice et al. |
|---|---|---|---|
| 2,803,615 | A | 8/1957 | Ahlbrecht et al. |
| 3,554,288 | A | 1/1971 | Ross |
| 3,653,442 | A | 4/1972 | Ross |
| 3,787,351 | A | 1/1974 | Olson |
| 3,902,557 | A | 9/1975 | Shaughnessy et al. |
| 4,018,689 | A | 4/1977 | Thompson |
| 4,440,653 | A | 4/1984 | Briscoe et al. |
| 4,460,791 | A | 7/1984 | Cooke |
| 4,557,837 | A | 12/1985 | Clark, III et al. |
| 4,565,639 | A | 1/1986 | Penny et al. |
| 4,609,043 | A | 9/1986 | Cullick |
| 4,702,849 | A | 10/1987 | Penny |
| 4,767,545 | A | 8/1988 | Karydas et al. |
| 4,823,873 | A | 4/1989 | Karydas |
| 4,921,619 | A | 5/1990 | Karydas |
| 4,923,009 | A | 5/1990 | Watkins |
| 4,975,468 | A | 12/1990 | Yiv |
| 4,993,448 | A | 2/1991 | Karydas et al. |
| 4,997,580 | A | 3/1991 | Karydas et al. |
| 5,042,580 | A | 8/1991 | Cullick et al. |
| 5,143,958 | A | 9/1992 | Lockhart et al. |
| 5,181,568 | A | 1/1993 | McKown et al. |
| 5,219,476 | A | 6/1993 | Lockhart et al. |
| 5,247,993 | A | 9/1993 | Sarem et al. |
| 5,338,465 | A | 8/1994 | Lockhart et al. |
| 5,358,052 | A | 10/1994 | Gidley |
| 5,415,229 | A | 5/1995 | Syndansk |
| 5,477,924 | A | 12/1995 | Pollack |
| 5,733,526 | A | 3/1998 | Trevino et al. |
| 5,965,659 | A | 10/1999 | Kubo et al. |
| 6,113,919 | A | 9/2000 | Reiss et al. |
| 6,127,430 | A | 10/2000 | Baran, Jr. et al. |
| 6,206,102 | B1 | 3/2001 | Pusch et al. |
| 6,255,263 | B1 | 5/2001 | Collins et al. |
| 6,274,060 | B1 | 8/2001 | Sakashita et al. |
| 6,443,230 | B1 | 9/2002 | Boles et al. |
| 6,579,572 | B2 | 6/2003 | Espin et al. |
| 6,660,693 | B2 | 12/2003 | Miller et al. |
| 6,664,354 | B2 | 12/2003 | Savu et al. |
| 6,689,854 | B2 | 2/2004 | Fan et al. |
| 6,729,409 | B1 | 5/2004 | Gupta et al. |
| 6,805,198 | B2 | 10/2004 | Huang et al. |
| 6,852,781 | B2 | 2/2005 | Savu et al. |
| 6,911,417 | B2 | 6/2005 | Chan et al. |
| 6,945,327 | B2 | 9/2005 | Ely et al. |
| 6,972,274 | B1 | 12/2005 | Slikta et al. |
| 7,199,197 | B2 | 4/2007 | Caldwell et al. |

(Continued)

FOREIGN PATENT DOCUMENTS

CA 2009732 8/1990

(Continued)

OTHER PUBLICATIONS

Adibhatla, B., et al., "Effect of surfactants on wettability of near-wellbore regions of gas reservoirs," J Petr Sci Engr (2006), 52:227-236.

(Continued)

*Primary Examiner*—Timothy J Kugel
(74) *Attorney, Agent, or Firm*—Edwin S. Flores; Chalker Flores, LLP

(57) ABSTRACT

Compositions comprise nonionic fluorinated polymeric surfactants and solvent. The solvent comprises: at least one of a polyol or polyol ether, wherein the polyol and polyol ether have from 2 to 25 carbon atoms; and at least one monohydroxy alcohol, ether, or ketone having from 1 to 4 carbon atoms, or a mixture thereof, wherein the solvent is capable of at least one of solubilizing or displacing brine or condensate in the hydrocarbon-bearing clastic formation. Embodiments of the compositions are useful in recovery of hydrocarbons from hydrocarbon-bearing clastic formations that contain brine and/or condensate.

29 Claims, 2 Drawing Sheets

U.S. PATENT DOCUMENTS

| | | | |
|---|---|---|---|
| 2003/0083448 | A1 | 5/2003 | Fan et al. |
| 2003/0092581 | A1* | 5/2003 | Crews .................. 507/100 |
| 2004/0186254 | A1 | 9/2004 | Fan et al. |
| 2005/0142563 | A1 | 6/2005 | Haddad et al. |
| 2005/0148491 | A1 | 7/2005 | Savu et al. |
| 2007/0029085 | A1 | 2/2007 | Panga et al. |
| 2007/0225176 | A1* | 9/2007 | Pope et al. .................. 507/221 |

FOREIGN PATENT DOCUMENTS

| | | |
|---|---|---|
| JP | 3-219248 | 9/1991 |
| JP | 7-101803 | 4/1995 |
| JP | 8-193021 | 7/1996 |
| WO | 2005/028589 A1 | 3/2005 |
| WO | 2005/035936 A1 | 4/2005 |
| WO | 2006028608 A1 | 3/2006 |
| WO | 2007/097975 A2 | 8/2007 |

OTHER PUBLICATIONS

Li, K., et al., "Experimental Study of Wettability Alteration to Preferential Gass-Wetting in Porous Media and Its Effects," SPE Reservoir Eval and Eng (2000), 3:139-149.

Tang, G-Q., et al., "Relative Permeability Modification in Gas-Liquid Systems Through Wettability Alteration to Intermediate Gas-Wetting," Oct. 2000, SPE 62934, Society of Petroleum Engineers Inc., pp. 1-15.

Al-Anazi et al., "Laboratory Measurements of Condensate Blocking and Treatment for Both Low and High Permeability Rocks", 2002, SPE 77546, Society of Petroleum Engineers Inc., pp. 1-9.

Al-Anazi et al., "A Successful Methanol Treatment in a Gas-Condensate Reservoir: Field Application", Mar. 2003, SPE 80901, Society of Petroleum Engineers Inc., pp. 1-9.

Al-Anazi, "Experimental Measurements of Condensate Blocking and Treatments in Low and High Permeability Cores" (Thesis), Dec. 2003, pp. 1-474.

Ayyalasomayajula et al., "Phase Behavior Modeling of Hydrocarbon-Methanol-Water Mixtures by Peng-Robinson and SAFT Equations of State", Sep. 2002, SPE 77575, Society of Petroleum Engineers Inc., pp. 1-8.

Ayyalasomayajula, "Prediction of Bulk and Interfacial Thermodynamic Properties of Polar Mixtures by Statistical Associating Fluid Theory" (Thesis), May 2003, pp. 1-268.

Bang, "Phase Behavior Study of Hydrocarbon-Water-Alcohol Mixtures" (Thesis) May 2005, pp. 1-138.

Chowdhury, "Reservoir Simulation of Asphaltene Precipitation and of Gas Condensates" (Thesis), Dec. 2003, pp. 1-227.

Chowdhury et al., "A Semi-Analytical Method to Predict Well Deliverability in Gas-Condensate Reservoirs", Sep. 2004, SPE 90320, Society of Petroleum Engineers Inc., pp. 1-13.

Crema et al., "Foaming of Anhydrous Methanol for Well Stimulation", Apr. 1985, SPE 13565, Society of Petroleum Engineers Inc., 4 pages.

Du et al., "Use of Solvents to Improve the Productivity of gas Condensate Wells", Oct. 2000, SPE 62935, Society of Petroleum Engineers Inc., pp. 1-8.

Fahes et al., "Wettability Alteration to Intermediate Gas-Wetting in Gas-Condensate Reservoirs at High Temperatures", Oct. 2005, SPE 96184, Society of Petroleum Engineers Inc., pp. 1-14.

Gadde et al., "Modeling Proppant Settling in Water-Fracs", Sep. 2004, SPE 89875, Society of Petroleum Engineers Inc., pp. 1-10.

Kumar, "A Simulation Study of Carbon Sequestration in Deep Saline Aquifers" (Thesis), Aug. 2004, pp. 1-192.

Lee, "Phase Equilibria in Systems Containing Hydrocarbon, Water and Methanol" (Thesis), May 2003, pp. 1-92.

Mahadevan et al., "Clean-up of Water Blocks in Low Permeability Formations", Oct. 2003, SPE 84216, Society of Petroleum Engineers Inc., pp. 1-8.

Mahadevan et al., "Evaporative Clean-up of Water-Blocks in Gas Wells", Apr. 2005, SPE 94215, Society of Petroleum Engineers Inc., pp. 1-11.

Narayanaswamy et al., "Effect of Heterogeneity on the Non-Darcy Flow Coefficient", Mar. 1998, SPE 39979, Society of Petroleum Engineers Inc., pp. 1-17.

Nasr-El-Din et al., "Surface tension of HCI-based stimulation fluids at high temperatures", Jun. 2004, Journal of Petroleum Science and Engineering, vol. 43(1-2), pp. 57-73.

Ortiz et al., "Low-pH methanol: an alternative for stimulation in water-sensitive, tight, dirty sandstones", 1986, SPE Production Engineering (0885-9221), vol. 1(3). pp. 195-202.

Parekh et al., "Cleanup of Water Blocks in Depleted Low-Permeability Reservoirs", Sep. 2004, SPE 89837, Society of Petroleum Engineers Inc., pp. 1-12.

Pope et al., "Modeling Relative Permeability Effects in Gas-Condensate Reservoirs using a New Trapping Model", Sep. 1998, SPE 49266, Society of Petroleum Engineers Inc., pp. 1-8.

Product Information: 3M™ Novec Fluorosurfactant FC-4430, Oct. 2005, 6 pages.

Product Information: 3M™ Novec Fluorosurfactant FC 4432, Oct. 2005, 6 pages.

Product Information: 3M™ Novec Fluorosurfactant FC 4434, Jan. 2005, 4 pages.

Rai, "Parametric Study of Relative Permeability Effects on Gas-Condensate core Floods and Wells" (Thesis), Dec. 2003, pp. 1-319.

Sharma, "Modeling Gas Condensate Reservoirs and Development of a New Hybrid Well Model" (Thesis), May 2003, pp. 1-231.

Sharma et al., "Slick Water and Hybrid Fracs in the Bossier: Some Lessons Learnt", Sep. 2004, SPE 89876, Society of Petroleum Engineers Inc., pp. 1-12.

Wu et al., "Modeling Non-Equilibrium Mass Transfer Effects for a Gas Condensate Field", Mar. 1998, SPE 39764, Society for Petroleum Engineers Inc., pp. 1-16.

U.S. Department of Energy, "Comments on the Outlook for Balancing Natural Gas Supply and Demand, EPAct Section 1818: Natural Gas Shortage Report," http://www.fossil.energy.gov/epact/Section_1818/comments.html, accessed Mar. 16, 2008.

US 6,492,477, 12/2002, Savu et al. (withdrawn)

* cited by examiner

COMPOSITIONS AND METHODS FOR IMPROVING THE PRODUCTIVITY OF HYDROCARBON PRODUCING WELLS USING A NON-IONIC FLUORINATED POLYMERIC SURFACTANT

CROSS-REFERENCE TO RELATED APPLICATIONS

This application claims priority to and is a Continuation-in-Part of U.S. patent application Ser. No. 11/508,498, filed Aug. 23, 2006, the entire contents of which are incorporated herein by reference.

BACKGROUND

It is known in the subterranean well drilling art that in some wells (e.g., some oil and/or gas wells) brine is present in hydrocarbon-bearing geological formations in the vicinity of the wellbore (also known in the art as the "near wellbore region"). The brine may be naturally occurring (e.g., connate water) and/or may be a result of operations conducted on the well.

In the case of some wells (e.g., some gas wells), liquid hydrocarbons (also known in the art as "condensate") can form and accumulate in the near wellbore region. The presence of condensate can cause a large decrease in both the gas and condensate relative permeabilities, and thus the productivity of the well decreases.

The presence of brine and/or gas condensate in a near wellbore region of a hydrocarbon-bearing geological formation can inhibit or stop production of hydrocarbons from the well, and hence is typically undesirable.

Various approaches have been tried for increasing the hydrocarbon production of such wells. One approach, for example, involves a fracturing and propping operation (e.g., prior to, or simultaneously with, a gravel packing operation) to increase the permeability of the hydrocarbon-bearing geological formation adjacent to the wellbore. Chemical treatments (e.g., injection of methanol) have also been used to improve productivity of such oil and/or gas wells. The latter treatments are typically injected into the near wellbore region of a hydrocarbon-bearing geological formation where they interact with the brine and/or condensate to displace and/or dissolve it, thereby facilitating increased hydrocarbon production from the well.

Conventional treatments for increasing the hydrocarbon production from wells having brine and/or condensate in the near wellbore region of a hydrocarbon-bearing geological formation, however, are often relatively short-lived, and require expensive and time-consuming retreatment. Hence, there is a continuing need for alternative and/or improved techniques for increasing the productivity of oil and/or gas wells that have brine and/or condensate present in a near wellbore region of a hydrocarbon-bearing geological formation.

SUMMARY

In one aspect, the present invention provides a composition comprising:

a nonionic fluorinated polymeric surfactant, wherein the nonionic fluorinated polymeric surfactant comprises:

(a) at least one divalent unit represented by the formula:

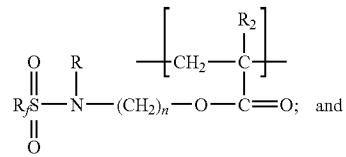

(b) at least one divalent unit represented by a formula:

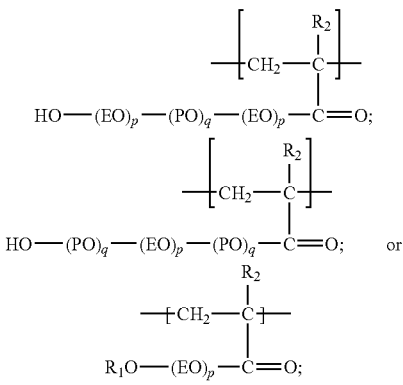

wherein
  $R_f$ represents a perfluoroalkyl group having from 1 to 8 carbon atoms;
  $R$, $R_1$, and $R_2$ are each independently hydrogen or alkyl of 1 to 4 carbon atoms;
  n is an integer from 2 to 10;
  EO represents —$CH_2CH_2O$—;
  each PO independently represents —$CH(CH_3)CH_2O$— or —$CH_2CH(CH_3)O$—;
  each p is independently an integer of from 1 to about 128; and
  each q is independently an integer of from 0 to about 55; and
solvent comprising:
  at least one of a polyol or polyol ether, wherein the polyol and polyol ether independently have from 2 to 25 carbon atoms; and
  at least one monohydroxy alcohol, ether, or ketone having from 1 to 4 carbon atoms, or a mixture thereof.

Typically, the solvent is capable of at least one of solubilizing or displacing brine or condensate in a hydrocarbon-bearing clastic formation. Although not wishing to be bound by theory, compositions and methods according to the present invention may increase the productivity of wells by solubilizing or displacing brine and/or condensate in a hydrocarbon-bearing clastic formation accompanied by formation of a surfactant layer on or about the rock in the formation in the near wellbore region.

In some embodiments, the solvent comprises at least one monohydroxy alcohol having from 1 to 4 carbon atoms. In some embodiments, the composition is essentially free of water. In some embodiments, the composition is homogenous at a temperature of at least 100° F. (37.8° C.). In some embodiments, the polyol and polyol ether independently have from 2 to 10 carbon atoms. In some embodiments, the polyol and polyol ether have a normal boiling point of less than 450° F. (232° C.). In some embodiments, $R_f$ is perfluorobutyl. In some embodiments, the nonionic fluorinated polymeric surfactant has a number average molecular weight in the range from 1,000 to 30,000 grams/mole.

In another aspect, the present invention provides a method of treating a hydrocarbon-bearing clastic formation, the method comprising injecting a composition into the hydrocarbon-bearing clastic formation, wherein the composition comprises:

a nonionic fluorinated polymeric surfactant, wherein the nonionic fluorinated polymeric surfactant comprises:

(a) at least one divalent unit represented by the formula:

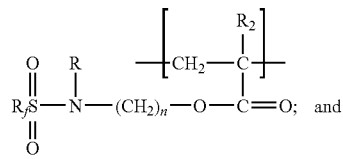

(b) at least one divalent unit represented by a formula:

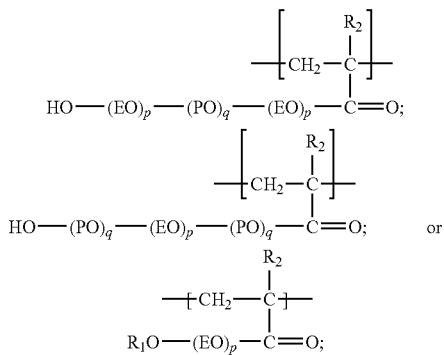

wherein
$R_f$ represents a perfluoroalkyl group having from 1 to 8 carbon atoms;
$R$, $R_1$, and $R_2$ are each independently hydrogen or alkyl of 1 to 4 carbon atoms;
n is an integer from 2 to 10;
EO represents $-CH_2CH_2O-$;
each PO independently represents $-CH(CH_3)CH_2O-$ or $-CH_2CH(CH_3)O-$;
each p is independently an integer of from 1 to about 128; and
each q is independently an integer of from 0 to about 55; and solvent comprising:
at least one of a polyol or polyol ether, wherein the polyol and polyol ether independently have from 2 to 25 carbon atoms; and
at least one monohydroxy alcohol, ether, or ketone having from 1 to 4 carbon atoms, or a mixture thereof,
wherein the solvent is capable of at least one of solubilizing or displacing brine or condensate in the hydrocarbon-bearing clastic formation.

In some embodiments, the solvent is capable of at least one of solubilizing or displacing brine in the hydrocarbon-bearing clastic formation. In some embodiments, the solvent is capable of at least one of solubilizing or displacing condensate in the hydrocarbon-bearing clastic formation. In some embodiments, the polyol and polyol ether independently have from 2 to 10 carbon atoms. In some embodiments, the brine comprises connate water. In some embodiments, the hydrocarbon-bearing clastic formation is downhole. In some embodiments, downhole conditions comprise a pressure in a range from about 1 bar to 1000 bars and a temperature in a range from about 100° F. (37.8° C.) to 400° F. (204° C.). In some embodiments, the composition is injected into the hydrocarbon-bearing clastic formation during and/or after fracturing the hydrocarbon-bearing clastic formation. In some embodiments, the hydrocarbon-bearing clastic formation has a wellbore therein, and the method further comprises obtaining hydrocarbons from the wellbore after injecting the composition into the hydrocarbon-bearing clastic formation.

Compositions and methods according to the present invention are typically useful, for example, for increasing the productivity of oil and/or gas wells that have brine and/or condensate present in a near wellbore region of a hydrocarbon-bearing clastic formation.

The effectiveness of compositions according to the present invention for improving hydrocarbon productivity of a particular oil and/or gas well having brine (and/or condensate) accumulated in the near wellbore region will typically be determined by the ability of the composition to dissolve the quantity of brine (and/or condensate) present in the near wellbore region of the well. Hence, at a given temperature greater amounts of compositions having lower brine (and/or condensate) solubility (i.e., compositions that can dissolve a relatively lower amount of brine or condensate) will typically be needed than in the case of compositions having higher brine (and/or condensate) solubility and containing the same surfactant at the same concentration.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The following definitions of terms apply throughout the specification and claims.

The term "brine" refers to water having at least one dissolved electrolyte salt therein (e.g., having any nonzero concentration, and which may be less than 1000 parts per million by weight (ppm), or greater than 1000 ppm, greater than 10,000 ppm, greater than 20,000 ppm, 30,000 ppm, 40,000 ppm, 50,000 ppm, 100,000 ppm, 150,000 ppm, or even greater than 200,000 ppm).

The term "downhole conditions" refers to the temperature, pressure, humidity, and other conditions that are commonly found in subterranean clastic formations.

The term "homogeneous" means macroscopically uniform throughout and not prone to spontaneous macroscopic phase separation.

The term "hydrocarbon-bearing clastic formation" includes both hydrocarbon-bearing clastic formations in the field (i.e., subterranean hydrocarbon-bearing clastic formations) and portions of such hydrocarbon-bearing clastic formations (e.g., core samples).

The term "hydrolyzable silane group" refers to a group having at least one Si—O-Z moiety that undergoes hydrolysis with water at a pH between about 2 and about 12, wherein Z is H or substituted or unsubstituted alkyl or aryl.

The term "nonionic" refers to being free of ionic groups (e.g., salts) or groups (e.g., —CO2H, —SO3H, —OSO3H, —P(=O)(OH)2) that are readily substantially ionized in water.

The term "normal boiling point" refers to the boiling point at a pressure of one atmosphere (100 kPa).

The term "polymer" refers to a molecule of molecular weight of at least 1000 grams/mole, the structure of which essentially includes the multiple repetition of units derived, actually or conceptually, from molecules of low relative molecular mass.

The term "polymeric" refers to including a polymer.

The term "solvent" refers to a homogenous liquid material (inclusive of any water with which it may be combined) that is capable of at least partially dissolving the nonionic fluorinated polymeric surfactant(s) with which it is combined at 25° C.

The term "surfactant" refers to a surface-active material.

The term "water-miscible" means soluble in water in all proportions.

The term "productivity" as applied to a well refers to the capacity of a well to produce hydrocarbons; that is, the ratio of the hydrocarbon flow rate to the pressure drop, where the pressure drop is the difference between the average reservoir pressure and the flowing bottom hole well pressure (i.e., flow per unit of driving force).

BRIEF DESCRIPTION OF THE DRAWING

For a more complete understanding of the features and advantages of the present invention, reference is now made to the detailed description along with the accompanying figures and in which.

DETAILED DESCRIPTION

Figure 1:
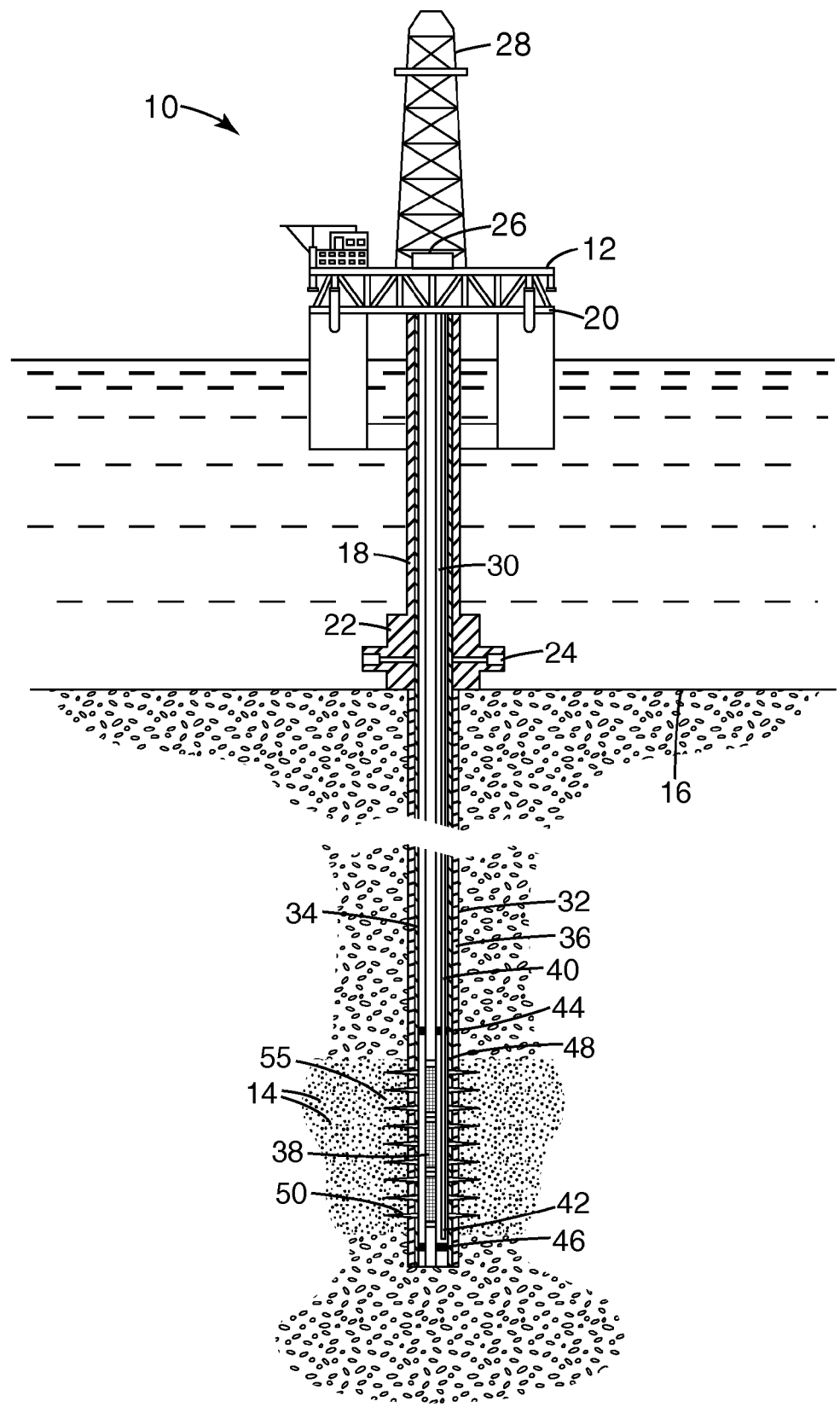
FIG. 1 is a schematic illustration of an exemplary embodiment of an offshore oil and gas platform operating an apparatus for progressively treating a near wellbore region according to the present invention.

Useful compositions comprise a nonionic fluorinated polymeric surfactant and solvent.

Useful nonionic fluorinated polymeric surfactants comprise:

(a) at least one divalent unit represented by the formula:

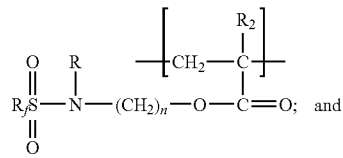

and (b) at least one divalent unit represented by a formula:

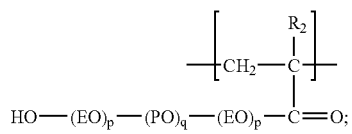

-continued

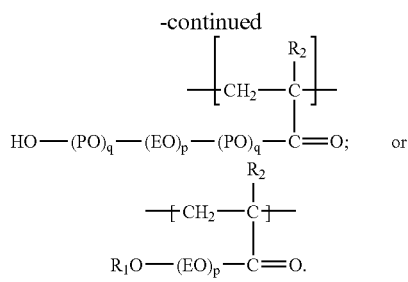

$R_f$ represents a perfluoroalkyl group having from 1 to 8 carbon atoms. Exemplary groups $R_f$ include perfluoromethyl, perfluoroethyl, perfluoropropyl, perfluorobutyl (e.g., perfluoro-n-butyl or perfluoro-sec-butyl), perfluoropentyl, perfluorohexyl, perfluoroheptyl, and perfluorooctyl.

R, $R_1$, and $R_2$ are each independently hydrogen or alkyl of 1 to 4 carbon atoms (e.g., methyl, ethyl, n-propyl, isopropyl, butyl, isobutyl, or t-butyl).

n is an integer from 2 to 10.

EO represents —CH$_2$CH$_2$O—.

Each PO independently represents —CH(CH$_3$)CH$_2$O— or —CH$_2$CH(CH$_3$)O—.

Each p is independently an integer of from 1 to about 128.

Each q is independently an integer of from 0 to about 55. In certain embodiments, q may be in a range of from 1 to 55 and the ratio p/q has a value of from at least 0.5, 0.75, 1 or 1.5 to 2.5, 2.7, 3, 4, 5, or more.

The nonionic fluorinated polymeric surfactants described hereinabove are typically preparable by copolymerization of:

(a) at least one compound represented by the formula

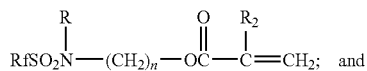

(b) at least one compound represented by a formula:

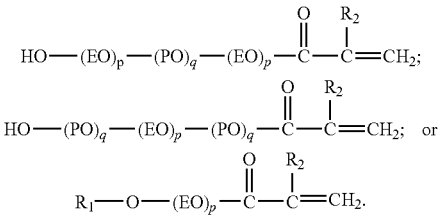

The nonionic fluorinated polymeric surfactants described above can be prepared, for example, by techniques known in the art (e.g., by free radical initiated copolymerization of a nonafluorobutanesulfonamido group-containing acrylate with a poly(alkyleneoxy) acrylate (e.g., monoacrylate or diacrylate) or mixtures thereof). Adjusting the concentration and activity of the initiator, the concentration of monomers, the temperature, and the chain-transfer agents can control the molecular weight of the polyacrylate copolymer. The description of the preparation of such polyacrylates is described, for example, in U.S. Pat. No. 3,787,351 (Olson), the disclosure of which is incorporated herein by reference. Preparation of nonafluorobutanesulfonamido acrylate monomers are described, for example, in U.S. Pat. No. 2,803,615 (Ahlbrecht et al.), the disclosure of which is incorporated herein by reference. Examples of fluoroaliphatic polymeric esters and their preparation are described, for example, in U.S. Pat. No. 6,664,354 (Savu et al.), the disclosure of which is incorporated herein by reference.

Methods described above for making nonafluorobutylsulfonamido group-containing structures can be used to make heptafluoropropylsulfonamido groups by starting with heptafluoropropylsulfonyl fluoride, which can be made, for example, by the methods described in Examples 2 and 3 of U.S. Pat. No. 2,732,398 (Brice et al.), the disclosure of which is incorporated herein by reference.

Useful nonionic fluorinated polymeric surfactants typically have a number average molecular weight in the range of from 1,000 to 10,000 grams/mole, 20,000 grams/mole, or even 30,000 grams/mole, although higher and lower molecular weights may also be useful.

It is also within the scope of the present invention to use mixtures of nonionic fluorinated polymeric surfactants.

In some embodiments, the nonionic fluorinated polymeric surfactant is free of hydrolyzable silane groups. This may be advantageous, for example, by prolonging the storage-life of the composition.

Typically, compositions according to the present invention include from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight of the nonionic fluorinated polymeric surfactant, based on the total weight of the composition. For example, the amount of the nonionic fluorinated polymeric surfactant in the compositions may be in a range of from 0.01 to 10; 0.1 to 10, 0.1 to 5, 1 to 10, or even in a range from 1 to 5 percent by weight of the nonionic fluorinated polymeric surfactant, based on the total weight of the composition. Lower and higher amounts of the nonionic fluorinated polymeric surfactant in the compositions may also be used, and may be desirable for some applications.

The ingredients for compositions described herein including nonionic fluorinated polymeric surfactants, solvent and optionally water can be combined using techniques known in the art for combining these types of materials, including using conventional magnetic stir bars or mechanical mixer (e.g., in-line static mixer and recirculating pump).

The solvent comprises at least one of a polyol or polyol ether and at least one monohydroxy alcohol, ether, or ketone having from 1 to 4 carbon atoms, or a mixture thereof. In the event that a component of the solvent is a member of two functional classes, it may be used as either class but not both. For example, ethylene glycol methyl ether may be a polyol ether or a monohydroxy alcohol, but not as both simultaneously.

In some embodiments, the solvent consists essentially of (i.e., does not contain any components that materially affect water solubilizing or displacement properties of the composition under downhole conditions) at least one of a polyol having from 2 to 25 (in some embodiments, 2 to 10) carbon atoms or polyol ether having from 2 to 25 (in some embodiments, 2 to 10) carbon atoms, and at least one monohydroxy alcohol having from 1 to 4 carbon atoms, ether having from 2 to 4 carbon atoms, or ketone having from 3 to 4 carbon atoms, or a mixture thereof.

The solvent comprises at least one polyol and/or polyol ether that has from 2 to 25 (in some embodiments, 2 to 10) carbon atoms.

As used herein in referring to the solvent, the term "polyol" refers to an organic molecule consisting of C, H, and O atoms connected one to another by C—H, C—C, C—O, O—H single bonds, and having at least two C—O—H groups. For example, in some embodiments, useful polyols may have from 2 to 8 carbon atoms or from 2 to 6 carbon atoms, and useful polyol ethers may have from 3 to 10 carbon atoms, for example, from 3 to 8 carbon atoms or from 5 to 8 carbon atoms. Exemplary useful polyols include ethylene glycol, propylene glycol, 1,3-propanediol, trimethylolpropane, glycerol, pentaerythritol, and 1,8-octanediol. In some embodiments, useful polyols include poly(propylene glycol) having formula $H[OCH(CH_3)CH_2]_nOH$, wherein n is an integer of at least 2 and up to 8 (in some embodiments, up to 7, 6, 5, 4, or even 3).

As used herein in referring to the solvent, the term "polyol ether" refers to an organic molecule consisting of C, H, and O atoms connected one to another by C—H, C—C, C—O, O—H single bonds, and which is at least theoretically derivable by at least partial etherification of a polyol. Exemplary useful polyol ethers include diethylene glycol monomethyl ether, ethylene glycol monobutyl ether, and dipropylene glycol monomethyl ether. The polyol and/or polyol ether may have a normal boiling point of less than 450° F. (232° C.); for example, to facilitate removal of the polyol and/or polyol ether from a well after treatment.

The solvent further comprises at least one monohydroxy alcohol, ether, and/or ketone that may have up to (and including) 4 carbon atoms. It is recognized that, by definition, ethers must have at least 2 carbon atoms, and ketones must have at least 3 carbon atoms.

As used herein in referring to the solvent, the term "monohydroxy alcohol" refers to an organic molecule formed entirely of C, H, and O atoms connected one to another by C—H, C—C, C—O, O—H single bonds, and having exactly one C—O—H group. Exemplary monohydroxy alcohols having from 1 to 4 carbon atoms include methanol, ethanol, n-propanol, isopropanol, 1-butanol, 2-butanol, isobutanol, and t-butanol.

As used herein in referring to the solvent, the term "ether" refers to an organic molecule formed entirely of C, H, and O atoms connected one to another by C—H, C—C, C—O, O—H single bonds, and having at least one C—O—C group. Exemplary ethers having from 2 to 4 carbon atoms include diethyl ether, ethylene glycol methyl ether, tetrahydrofuran, p-dioxane, and ethylene glycol dimethyl ether.

As used herein in referring to the solvent, the term "ketone" refers to an organic molecule formed entirely of C, H, and O atoms connected one to another by C—H, C—C, C—O single bonds and C=O double bonds, and having at least one C—C(=O)—C group. Exemplary ketones having from 3 to 4 carbon atoms include acetone, 1-methoxy-2-propanone, and 2-butanone.

The solvent is generally capable of solubilizing and/or displacing brine and/or condensate in the hydrocarbon-bearing clastic formation. For example, the solvent may be capable of at least one of solubilizing or displacing brine in the hydrocarbon-bearing clastic formation. Likewise, the solvent may be, for example, capable of at least one of solubilizing or displacing condensate in the hydrocarbon-bearing clastic formation.

Each solvent component may be present as a single component or a mixture of components. The amount of solvent typically varies inversely with the amount of components in compositions according to the present invention. For example, based on the total weight of the composition the solvent may be present in the composition in an amount of from at least 10, 20, 30, 40, or 50 percent by weight or more up to 60, 70, 80, 90, 95, 98, or even 99 percent by weight, or more.

Generally, the amount of the nonionic fluorinated polymeric surfactant and solvent (and type of solvent) is dependent on the particular application since conditions typically vary between wells, at different depths of individual wells, and even over time at a given location in an individual well. Advantageously, compositions and methods of the present invention can be customized for individual wells and conditions.

Without wishing to be bound by theory, it is believed that more desirable well treatment results are obtained when the composition used in a particular near wellbore region of a well is homogenous at the temperature(s) encountered in the near wellbore region. Accordingly, the composition typically selected to treat the near wellbore region of a hydrocarbon-bearing clastic formation is typically homogenous at at least one temperature found in the near wellbore region.

In some embodiments, compositions according to the present invention may further include water (e.g., in the solvent). In some embodiments, compositions according to the present invention are essentially free of water (i.e., contains less than 0.1 percent by weight of water based on the total weight of the composition).

Embodiments of compositions according to the present invention may be useful, for example, for recovering hydrocarbons (e.g., at least one of methane, ethane, propane, butane, hexane, heptane, or octane) from hydrocarbon-bearing subterranean clastic formations (in some embodiments, predominantly sandstone).

Referring to FIG. 1, an exemplary offshore oil and gas platform is schematically illustrated and generally designated 10. Semi-submersible platform 12 is centered over submerged hydrocarbon-bearing clastic formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing clastic formation 14. Casing 34 is cemented within wellbore 32 by cement 36. Work string 30 may include various tools including, for example, sand control screen assembly 38 which is positioned within wellbore 32 adjacent to hydrocarbon-bearing clastic formation 14. Also extending from platform 12 through wellbore 32 is fluid delivery tube 40 having fluid or gas discharge section 42 positioned adjacent to hydrocarbon-bearing clastic formation 14, shown with production zone 48 between packers 44, 46. When it is desired to treat the near-wellbore region of hydrocarbon-bearing clastic formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing clastic formation 14 including perforations 50. Thereafter, a composition described herein is pumped down delivery tube 40 to progressively treat near-wellbore region 55 of hydrocarbon-bearing clastic formation 14.

While the drawing depicts an offshore operation, the skilled artisan will recognize that the compositions and methods for treating a production zone of a wellbore are equally well-suited for use in onshore operations. Also, while the drawing depicts a vertical well, the skilled artisan will also recognize that compositions and methods for wellbore treatment of the present invention are equally well-suited for use in deviated wells, inclined wells or horizontal wells.

Methods of using compositions described herein are useful, for example, on both existing and new wells. Typically, it is believed to be desirable to allow for a shut-in time after compositions described herein are contacted with the hydrocarbon-bearing clastic formations. Exemplary set in times include a few hours (e.g., 1 to 12 hours), about 24 hours, or even a few (e.g., 2 to 10) days.

The skilled artisan, after reviewing the instant disclosure, will recognize that various factors may be taken into account in practice of the present invention including, for example, the ionic strength of the composition, pH (e.g., a range from a pH of about 4 to about 10), and the radial stress at the wellbore (e.g., about 1 bar (100 kPa) to about 1000 bars (100 MPa)).

The present invention includes compositions and methods for the injection of nonionic fluorinated polymeric surfactants that modify the wetting properties of the rock in a near wellbore region of a hydrocarbon-bearing geological formation to remove brine and/or condensate. Although not wanting to be bound by theory, it is believed the nonionic fluorinated polymeric surfactants generally adsorb to clastic formations under downhole conditions and typically remain at the target site for the duration of an extraction (e.g., 1 week, 2 weeks, 1 month, or longer).

Compositions according to the present invention are typically useful for treating hydrocarbon-bearing clastic formations (e.g., hydrocarbon-bearing clastic formation that are predominantly sandstone), especially those containing brine and/or condensate. The method comprises injecting a composition according to the present invention into the hydrocarbon-bearing clastic formation. Typically, after treatment according to the present invention hydrocarbons are then obtained from the wellbore at an increased rate, as compared the rate prior to treatment.

The method may be practiced, for example, in a laboratory environment (e.g., on a core sample (i.e., a portion) of a hydrocarbon-bearing clastic formation) or in the field (e.g., on a subterranean hydrocarbon-bearing clastic formation situated downhole in a well). Typically, methods according to the present invention are applicable to downhole conditions having a pressure in a range of from about 1 bar (100 kPa) to about 1000 bars (100 MPa) and a temperature in a range from about 100° F. (37.8° C.) to 400° F. (204° C.), although they may also be used to treat hydrocarbon-bearing clastic formations under other conditions.

In addition to brine and/or condensate, other materials (e.g., asphaltene or water) may be present in the hydrocarbon-bearing clastic formation. Compositions and methods according to the present invention may also be used in those cases.

Compositions according to the present invention may be injected into hydrocarbon-bearing clastic formations in wells using methods (e.g., by pumping under pressure) well known to those skilled in the oil and gas art.

Hydraulic fracturing is commonly used to increase the productivity of brine and/or condensate blocked wells, that is, wells that having a brine and/or condensate in the near wellbore region of a hydrocarbon-bearing geological formation. The hydraulic fracturing method is relatively expensive, and may not be applicable in cases where brine or condensate is present, for example, as fracturing into additional brine or condensate bearing geological regions may occur. However, in some instances it may be desirable to utilize fracturing techniques and/or proppants as known in the art in conjunction with the instant invention to increase the production of hydrocarbon extraction from subterranean elastic formations. It may also be desirable to treat proppant with a composition described herein prior to injecting the well. Sand proppants are available, for example, from Badger Mining Corp., Berlin, Wis.; Borden Chemical, Columbus, Ohio; Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company.

In some embodiments, compositions according to the present invention are injected into the hydrocarbon-bearing clastic formation during fracturing, after fracturing, or during and after fracturing the hydrocarbon-bearing clastic formation.

Advantages and embodiments of this invention are further illustrated by the following examples, but the particular materials and amounts thereof recited in these examples, as well as other conditions and details, should not be construed to unduly limit this invention. Unless otherwise noted, all parts, percentages, ratios, etc. in the examples and the rest of the specification are by weight. In the Tables, "nd" means not determined.

EXAMPLES

Preparation of Fluorosurfactant A

Fluorosurfactant A was prepared essentially as in Example 4 of U.S. Pat. No. 6,664,354 (Savu), except using 15.6 grams (g) of 50/50 mineral spirits/TRIGONOX-21-C50 organic peroxide initiator (tert-butyl peroxy-2-ethylhexanoate available from Akzo Nobel, Arnhem, the Netherlands) in place of 2,2'-azobisisobutyronitrile, and with 9.9 g of 1-methyl-2-pyrrolidinone added to the charges.

Preparation of Fluorosurfactant B

Fluorosurfactant B was prepared essentially as in Example 4 of U.S. Pat. No. 6,664,354 (Savu), except using N-methylperfluorobutanesulfonamidoethyl acrylate (MeFBSEA) and PLURONIC acrylate in a weight ratio of 38:62 and 15.6 g of 50/50 mineral spirits/TRIGONOX-21-C50 organic peroxide initiator in place of 2,2'-azobisisobutyronitrile, and with 9.9 g of 1-methyl-2-pyrrolidinone added to the charges.

Examples 1-24

General Procedure

Fluorosurfactant A (0.06 gram (g)) and two solvents (Solvent 1 and Solvent 2, 3 g total amount) were added to a vial to prepare a sample. Brine (composition: Ca=2096 ppm, Sr=444 ppm, Ba=212 ppm, Mg=396 ppm, K=277 ppm, Na=21015 ppm, Fe (dissolved)=9 ppm, Fe (total)=10 ppm, counterion was chloride, remainder was water) (0.25 g) was added to the vial, the vial shaken by hand, and the vial was placed in a heated bath at 90° C. for one hour. The vial was removed from the bath, and then visually inspected to determine whether the sample was one phase. If the sample was one-phase, the brine addition, shaking and heating steps were repeated until the sample was no longer one-phase.

The solvents used for each Example and the initial amounts of the solvents are shown in Table 1 (below), wherein indicated weight percents of brine are based on the combined total weight of the solvents, brine, and surfactant.

TABLE 1

| EXAMPLE | SOLVENT 1 (parts by weight) | SOLVENT 2 (parts by weight) | BRINE (wt. %) NO PHASE SEPARATION | BRINE (wt. %) PHASE-SEPARATED |
|---|---|---|---|---|
| 1 | 1,3-propanediol (80) | isopropanol (IPA) (20) | 13.6 | 21.5 |
| 2 | propylene glycol (PG) (70) | IPA (30) | 32.9 | 36.4 |
| 3 | PG (90) | IPA (10) | 19.7 | 24.6 |
| 4 | PG (80) | IPA (20) | 29 | 32.9 |
| 5 | ethylene glycol (EG) (50) | ethanol (50) | nd | 24.6 |
| 6 | EG (70) | ethanol (30) | nd | 24.6 |
| 7 | propylene glycol monobutyl ether (PGBE) (50) | ethanol (50) | nd | 24.6 |
| 8 | PGBE (70) | ethanol (30) | 14.0 | 19.7 |
| 9 | dipropylene glycol monomethyl ether (DPGME) (50) | ethanol (50) | 47.3 | 49.5 |
| 10 | DPGME (70) | ethanol (30) | 47.3 | 49.5 |
| 11 | diethylene glycol monomethyl ether (DEGME) (70) | ethanol (30) | 32.9 | 36.4 |
| 12 | triethylene glycol monomethyl ether (TEGME) (50) | ethanol (50) | nd | 24.6 |
| 13 | TEGME (70) | ethanol (30) | nd | 24.6 |
| 14 | 1,8-octanediol (50) | ethanol (50) | 51.5 | nd |
| 15 | PG (70) | tetrahydrofuran (THF) (30) | 24.6 | 29.0 |
| 16 | PG (70) | acetone (30) | 29.0 | 32.9 |
| 17 | PG (70) | methanol (30) | nd | 24.6 |
| 18 | PG (60) | IPA (40) | 39.5 | 42.4 |

TABLE 1-continued

| EXAMPLE | SOLVENT 1 (parts by weight) | SOLVENT 2 (parts by weight) | BRINE (wt. %) NO PHASE SEPARATION | BRINE (wt. %) PHASE-SEPARATED |
|---|---|---|---|---|
| 19 | 2-butoxyethanol (BE) (80) | ethanol (20) | 42.4 | 45.0 |
| 20 | BE (70) | ethanol (30) | 45.0 | 49.5 |
| 21 | BE (60) | ethanol (40) | 45.0 | 49.5 |
| 22 | PG (70) | ethanol (30) | 24.6 | 29.0 |
| 23 | EG (70) | IPA (30) | 3.8 | 7.3 |
| 24 | glycerol (70) | IPA (30) | nd | 7.6 |

Examples 25-30

The General Procedure described in Examples 1-24 was followed with the modification that Fluorosurfactant B was used in place of Fluorosurfactant A. The solvents used for each Example and the initial amounts of the solvents are shown in Table 2 (below), wherein indicated weight percents of brine are based on the combined total weight of the solvents, brine, and surfactant.

TABLE 2

| EXAMPLE | SOLVENT 1 (parts by weight) | SOLVENT 2 (parts by weight) | BRINE (wt. %) NO PHASE SEPARATION | BRINE (wt. %) PHASE-SEPARATED |
|---|---|---|---|---|
| 25 | PG (80) | IPA (20) | nd | 24.6 |
| 26 | PG (70) | IPA (30) | 24.6 | 29 |
| 27 | PG (60) | IPA (40) | 29 | 32.9 |
| 28 | DEGME (70) | ethanol (30) | 24.6 | 29.0 |
| 29 | DPGME (70) | ethanol (30) | 36.4 | 39.5 |

Examples 30-31

The procedure described in Examples 1-24 was followed with the following modifications. The amount of surfactant used was 0.12 g, and water was used instead of brine. The solvents used for each Example and the initial amounts of the solvents are shown in Table 3 (below), wherein indicated weight percents of water are based on the combined total weight of the solvents, water, and surfactant.

TABLE 3

| EXAMPLE | SOLVENT 1 (pats by weight) | SOLVENT 2 (parts by weight) | WATER (wt. %) NO PHASE SEPARATION | WATER (wt. %) PHASE-SEPARATED |
|---|---|---|---|---|
| 30 | EG (70) | IPA (30) | 7.1 | 10.3 |
| 31 | PG (70) | IPA (30) | 31.6 | 38.1 |

Examples 32-33, Illustrative Example 1, and Comparative Example A

General Procedure

Fluorosurfactant A (2% by weight) and two solvents were combined. The components were mixed together using a magnetic stirrer and magnetic stir bar. The solvents and amounts (in wt. % based on the total weight of the composition) used for Examples 32 and 33, Illustrative Example 1, and Comparative Example A are reported in Table 4, below.

TABLE 4

| EXAMPLE | SOLVENT 1 (wt. %) | SOLVENT 2 (wt. %) |
|---|---|---|
| 32 | PG (69) | IPA (29) |
| 33 | DPGME (69) | ethanol (29) |
| Illustrative Example 1 | PG (69) | ethanol (29) |
| Comparative Example A | methanol (94) | water (4) |

Core Flood Evaluation

Figure 2:
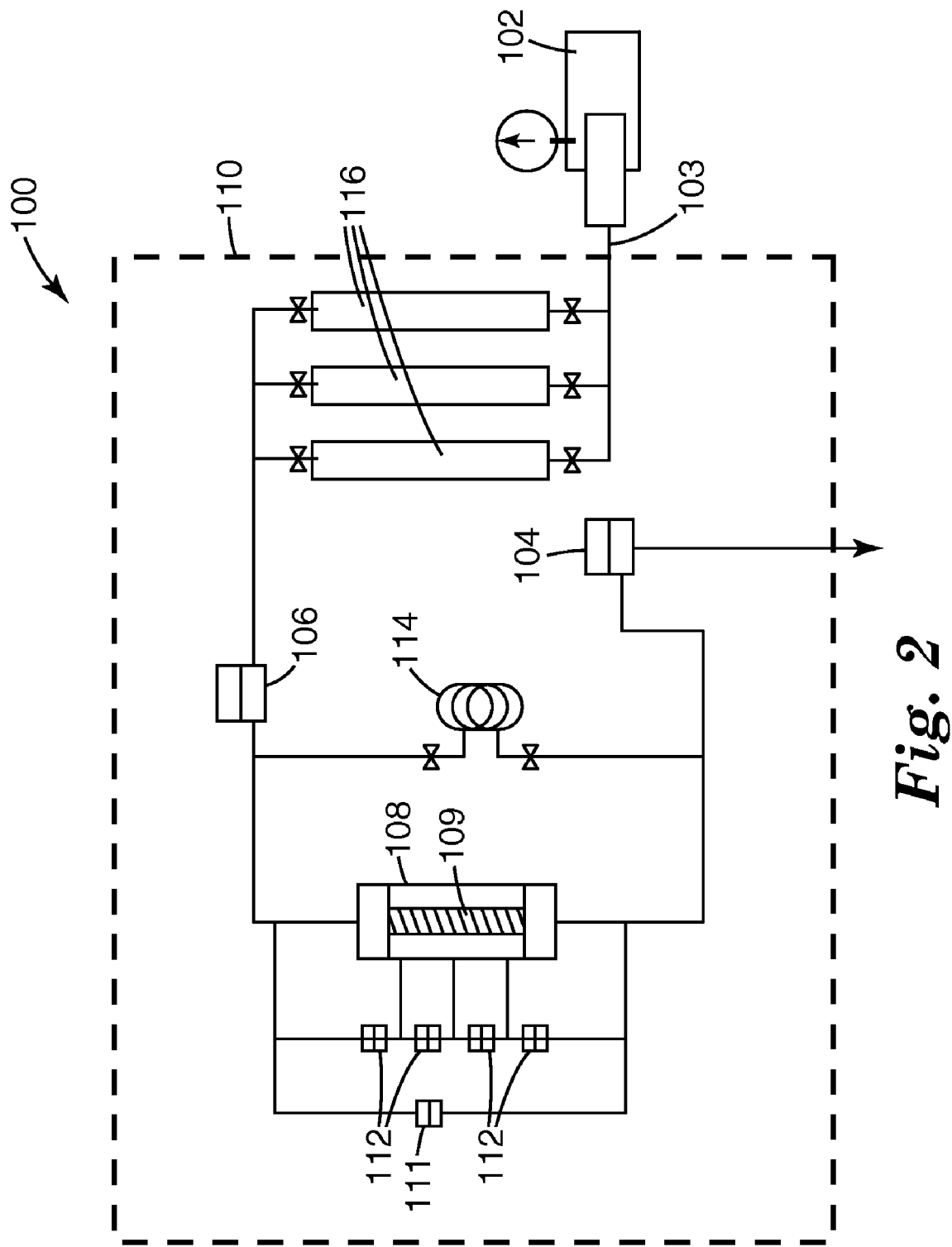
FIG. 2 is a schematic illustration of the core flood set-up used for the Examples.

Core Flood Setup:

A schematic diagram of a core flood apparatus 100 used to determine relative permeability of a substrate sample (i.e., core) is shown in FIG. 2. Core flood apparatus 100 included positive displacement pumps (Model No. 1458; obtained from General Electric Sensing, Billerica, Mass.) 102 to inject fluid 103 at constant rate into fluid accumulators 116. Multiple pressure ports 112 on high-pressure core holder 108 (Hassler-type Model UTPT-1x8-3K-13 obtained from Phoenix, Houston Tex.) were used to measure pressure drop across four sections (2 inches in length each) of core 109. An additional pressure port 111 on core holder 108 was used to measure pressure drop across the entire length (8 inches) of core 109. In some experiments, pressure ports 112 were not used to make pressure measurements. Two back-pressure regulators (Model No. BPR-50; obtained from Temco, Tulsa, Okla.) 104, 106 were used to control the flowing pressure upstream 106 and downstream 104 of core 109. A capillary viscometer 114 was placed in-line to evaluate fluid going through core 109. The capillary viscometer consisted of a stainless steel (SS-316) capillary tube with $\frac{1}{16}$th inch (0.15875 centimeter (cm)) outer diameter purchased from Swagelok. The capillary viscometer was used to determine the viscosity of selected fluids and not for each core flood experiment.

The entire apparatus with the exception of the positive displacement pumps 102 was enclosed inside pressure- and temperature-controlled oven 110 (Model DC 1406F; maximum temperature rating of 650° F. (343° C.). obtained from SPX Corporation, Williamsport, Pa.) at 275° F. (135° C.). The maximum flow rate of fluid was 7,000 mL/hr. The flow of fluid was through a vertical core to avoid gravity segregation of the gas.

Substrates:

The substrates for core flooding evaluation were Berea sandstone core plugs used for Examples 32-33, Illustrative Example 1 and Comparative Example A (i.e., one core for each example or comparative example). Representative properties of these core plugs are reported in Table 5, below.

TABLE 5

| | Berea Sandstone |
|---|---|
| Diameter, inch (cm) | 1.0 (2.54) |
| Length, inch (cm) | 8.0 (20.32) |
| Pore volume, mL | 20.6 |
| Porosity, % | 20.0 |

The porosity was measured using either a gas expansion method or by the weight difference between a dry and a fully saturated core sample. The pore volume is the product of the bulk volume and the porosity.

Synthetic Condensate Composition

A synthetic gas-condensate fluid containing 93 mole percent methane, 4 mole percent n-butane, 2 mole percent n-decane, and 1 mole percent n-pentadecane was used for the core flooding evaluation. Approximate values for various properties of the fluid are reported Table 6, below.

TABLE 6

| Dewpoint, psig (Pa) | 4200 ($2.9 \times 10^7$) |
|---|---|
| Core pressure, psig (Pa) | 1500 ($1.0 \times 10^7$) |
| Liquid dropout, V/Vt % | 3.2 |
| Gas viscosity, cP | 0.017 |
| Oil viscosity, cP | 0.22 |
| Interfacial tension, dynes/cm | 5.0 |

Core Preparation

The cores described in Table 5 were dried for 72 hours in a standard laboratory oven at 95° C., and then were wrapped in aluminum foil and heat shrink tubing (obtained under the trade designation "TEFLON HEAT SHRINK TUBING" from Zeus, Inc., Orangeburg, S.C.). Referring again to FIG. 2, the wrapped core 109 was placed in core holder 108 inside oven 110 at 75° F. (24° C.). An overburden pressure of 3400 psig ($2.3 \times 10^7$ Pa) was applied. The initial single-phase gas permeability was measured using either nitrogen or methane at a flowing pressure of 1200 psig ($8.3 \times 10^6$ Pa).

Brine, containing 92.25% water, 5.9% sodium chloride, 1.6% calcium chloride, 0.23% magnesium chloride hexahydrate, and 0.05% potassium chloride, was introduced into the core 109 by the following procedure. The outlet end of the core holder was connected to a vacuum pump and a full vacuum was applied for 30 minutes with the inlet closed. The inlet was connected to a burette with the brine in it. The outlet was closed and the inlet was opened to allow a known volume of brine to flow into the core. For example, a 26% connate water saturation (i.e., 26% of the pore volume of the core was saturated with water) was established by allowing 5.3 ml of brine to flow into the core before the inlet value was closed. The permeability was measured at connate water saturation by flowing nitrogen or methane gas at 1200 psig and 75° F. (24° C.).

Core Flooding Procedure

Referring again to FIG. 2, the wrapped core 109 in the core holder 108 was placed inside oven 110 at 275° F. (135° C.) for several hours to allow it to reach reservoir temperature. The synthetic gas-condensate fluid described above was then introduced at a flow rate of about 690 mL/hr until steady state was established. Upstream back-pressure regulator 106 was set at about 4900 psig ($3.38 \times 10^7$ Pa), above the dew point pressure of the fluid, and downstream back-pressure regulator 104 was set at about 1500 psig ($3.38 \times 10^7$ Pa), corresponding to the bottom hole flowing well pressure. The gas relative permeability before treatment was then calculated from the steady state pressure drop. The surfactant composition was then injected into the core. After at least 20 pore volumes were injected, the surfactant composition was held in the core at 275° F. (135° C.) for about 15 hours. The synthetic gas condensate fluid described above was then introduced again at a flow rate of about 690 mL/hr using positive displacement pump 102 until a steady state was reached. The gas relative permeability after treatment was then calculated from the steady state pressure drop. Following the relative permeability measurements, methane gas was injected, using positive displacement pump 102, to displace the condensate and measure the final single-phase gas permeability to demonstrate that no damage had been done to the core.

For Examples 32 and 33, Illustrative Example 1, and Comparative Example A, the initial single-phase gas permeability, measured prior to brine saturation, the initial capillary number, the gas relative permeability before treatment with the surfactant composition, the gas relative permeability after treatment, and the ratio of the gas relative permeabilities after and before treatment (i.e., improvement factor) are reported in Table 7, below.

TABLE 7

| | EXAMPLE 32 | EXAMPLE 33 | ILLUSTRATIVE EXAMPLE 1 | COMPARATIVE EXAMPLE A |
|---|---|---|---|---|
| Gas permeability, millidarcy (md) | 88 | 62 | 269 | 231 |
| Capillary number | $1.4 \times 10^{-5}$ | $7.3 \times 10^{-6}$ | $6.5 \times 10^{-6}$ | $1.1 \times 10^{-5}$ |
| Gas relative permeability before treatment | 0.074 | 0.24 | 0.12 | 0.084 |
| Gas relative permeability after treatment | 0.13 | 0.40 | 0.12 | 0.084 |
| Improvement factor | 1.7 | 1.7 | 1.0 | 1.0 |

It is believed that Illustrative Example 1 showed no improvement in the core flooding experiment because the amount of brine present in the core was greater than the amount of brine that can be solubilized by the composition as shown in Example 22.

Example 34

The core flood evaluation procedure and conditions described for Example 32 were followed, except the core flooding was conducted on a Reservoir Core A sandstone with the properties reported in Table 8, below.

TABLE 8

|  | RESERVOIR CORE A |
| --- | --- |
| Diameter, inch (cm) | 1.0 (2.5) |
| Length, inch (cm) | 4.5 (11.4) |
| Pore volume (mL) | 6.2 |
| Porosity (%) | 10.8 |

The pore volume and porosity values shown in Table 8 were determined as describe above in Example 32 for the Berea sandstone core plugs.

The results from the core flooding experiment are reported in Table 9, below.

TABLE 9

|  | Reservoir Core A |
| --- | --- |
| Gas permeability, md | 61 |
| Capillary number | $1.5 \times 10^{-5}$ |
| Gas relative permeability before treatment | 0.074 |
| Gas relative permeability after treatment | 0.13 |
| Improvement factor | 1.7 |

Example 35

Fluorosurfactant A (0.06 g), 1 g of poly(propylene glycol) (425 molecular weight grade obtained from Sigma-Aldrich, St. Louis, Mo.) and 1 g of methanol were added to a vial. The vial was shaken by hand until a homogeneous solution was observed. 0.9 g brine (composition: 12% by weight sodium chloride and 6% by weight calcium chloride in water) was added to a vial. The vial was shaken by hand and placed in a heated bath at 160° C. for 15 minutes. The vial was removed from the bath, visually inspected, and the contents were determined to be one phase with no precipitate.

Various modifications and alterations of this invention may be made by those skilled in the art without departing from the scope and spirit of this invention, and it should be understood that this invention is not to be unduly limited to the illustrative embodiments set forth herein.

What is claimed is:

1. A composition comprising:
  a nonionic fluorinated polymeric surfactant, wherein the nonionic fluorinated polymeric surfactant comprises:
  (a) at least one divalent unit represented by the formula:

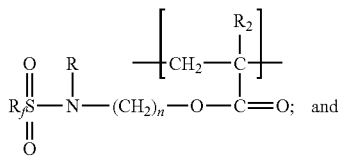

(b) a polyalkyleneoxy segment;
  wherein
    $R_f$ represents a perfluoroalkyl group having from 1 to 8 carbon atoms;
    R and $R_2$ are each independently hydrogen or alkyl of 1 to 4 carbon atoms; and
    n is an integer from 2 to 10;
  solvent comprising:
    at least one of a polyol or polyol ether, wherein the polyol and polyol ether independently have from 2 to 25 carbon atoms; and
    at least one monohydroxy alcohol, ether, or ketone having from 1 to 4 carbon atoms, or a mixture thereof.

2. The composition of claim 1, wherein the solvent is capable of at least one of solubilizing or displacing brine or condensate in a hydrocarbon-bearing clastic formation.

3. A method of treating a hydrocarbon-bearing elastic formation, the method comprising injecting the composition of claim 2 into the hydrocarbon-bearing clastic formation.

4. The method of claim 3, wherein the solvent is capable of at least one of solubilizing or displacing brine in the hydrocarbon-bearing clastic formation.

5. The method of claim 3, wherein the brine comprises connate water.

6. The method of claim 3, wherein said at least one polyol or polyol ether comprises at least one of ethylene glycol, propylene glycol, 1,3-propanediol, 1,8-octanediol, diethylene glycol monomethyl ether, ethylene glycol monobutyl ether, or dipropylene glycol monomethyl ether.

7. The method of claim 3, wherein the solvent comprises at least one monohydroxy alcohol having from 1 to 4 carbon atoms.

8. The method of claim 3, wherein said at least one monohydroxy alcohol, ether, or ketone having from 1 to 4 carbon atoms comprises at least one of methanol, ethanol, isopropanol, tetrahydrofuran, or acetone.

9. The method of claim 3, wherein the composition is essentially free of water.

10. The method of claim 3, wherein the hydrocarbon-bearing clastic formation has at least one temperature, and wherein the composition is homogeneous at the temperature.

11. The method of claim 3, wherein the polyol or polyol ether has a normal boiling point of less than 450° F.

12. The method of claim 3, wherein $R_f$ is perfluorobutyl.

13. The method of claim 3, wherein the nonionic fluorinated polymeric surfactant has a number average molecular weight in the range from 1,000 to 30,000 grams/mole.

14. The method of claim 3, wherein the hydrocarbon-bearing clastic formation is downhole.

15. The method of claim 3, wherein downhole conditions comprise a pressure in a range from about 1 bar to 1000 bars and a temperature in a range of from about 100° F. to 400° F.

16. The method of claim 3, wherein the composition is injected into the hydrocarbon-bearing clastic formation during fracturing, after fracturing, or during and after fracturing, the hydrocarbon-bearing clastic formation.

17. The method of claim 3, wherein the hydrocarbon-bearing clastic formation has a wellbore therein, the method further comprising obtaining hydrocarbons from the wellbore after injecting the composition into the hydrocarbon-bearing clastic formation.

18. The method of claim 3, wherein the polyol and polyol ether independently have from 2 to 10 carbon atoms.

19. The method of claim 3, wherein the nonionic fluorinated polymeric surfactant comprises at least one divalent unit represented by formula:

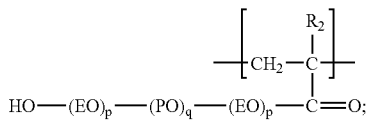

-continued

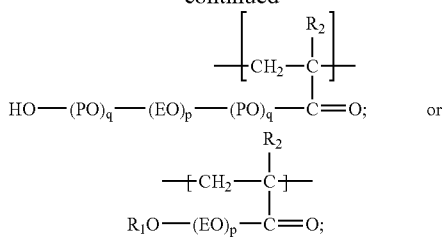

wherein
R$_1$ and R$_2$ are each independently hydrogen or alkyl of 1 to 4 carbon atoms;
EO represents —CH$_2$CH$_2$O—;
each PO independently represents —CH(CH$_3$)CH$_2$O— or —CH$_2$CH(CH$_3$)O—;
each p is independently an integer of from 1 to about 128; and
each q is independently an integer of from 0 to about 55.

20. The composition of claim 1, wherein said at least one polyol or polyol ether comprises at least one of ethylene glycol, propylene glycol, 1,3-propanediol, 1,8-octanediol, diethylene glycol monomethyl ether, ethylene glycol monobutyl ether, or dipropylene glycol monomethyl ether.

21. The composition of claim 1, wherein the solvent comprises at least one monohydroxy alcohol having from 1 to 4 carbon atoms.

22. The composition of claim 1, wherein said at least one monohydroxy alcohol, ether, or ketone having from 1 to 4 carbon atoms comprises at least one of methanol, ethanol, isopropanol, tetrahydrofuran, or acetone.

23. The composition of claim 1, wherein the composition is essentially free of water.

24. The composition of claim 1, wherein the composition is homogeneous at a temperature of at least 100° F.

25. The composition of claim 1, wherein the polyol or polyol ether has a normal boiling point of less than 450° F.

26. The composition of claim 1, wherein R$_f$ is perfluorobutyl.

27. The composition of claim 1, wherein the nonionic fluorinated polymeric surfactant has a number average molecular weight in the range of from 1,000 to 30,000 grams/mole.

28. The composition of claim 1, wherein the polyol and polyol ether independently have from 2 to 10 carbon atoms.

29. The composition of claim 1, wherein the nonionic fluorinated polymeric surfactant comprises at least one divalent unit represented by formula:

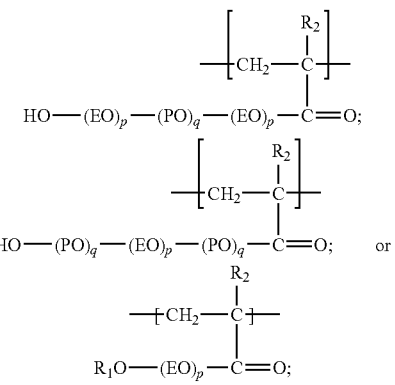

wherein
R$_1$ and R$_2$ are each independently hydrogen or alkyl of 1 to 4 carbon atoms;
EO represents —CH$_2$CH$_2$O—;
each PO independently represents —CH(CH$_3$)CH$_2$O— or —CH$_2$CH(CH$_3$)O—;
each p is independently an integer of from 1 to about 128; and
each q is independently an integer of from 0 to about 55.

* * * * *